UNITED STATES PATENT OFFICE.

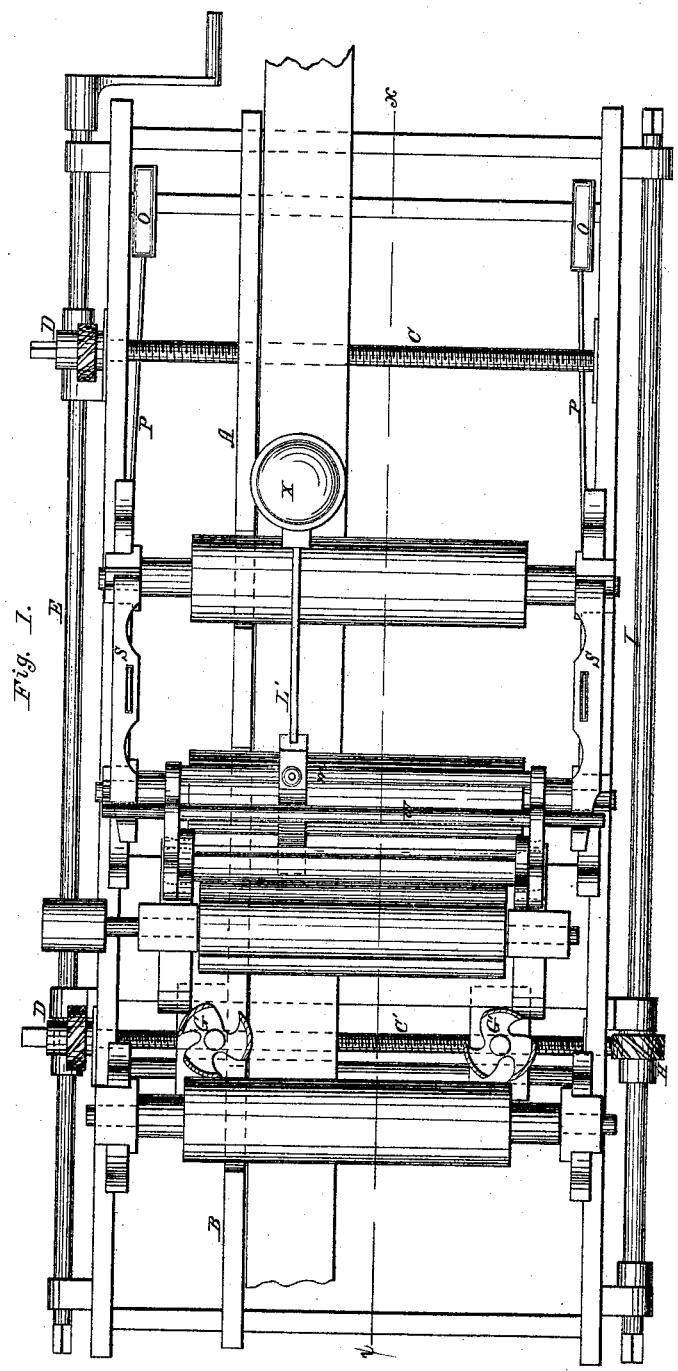

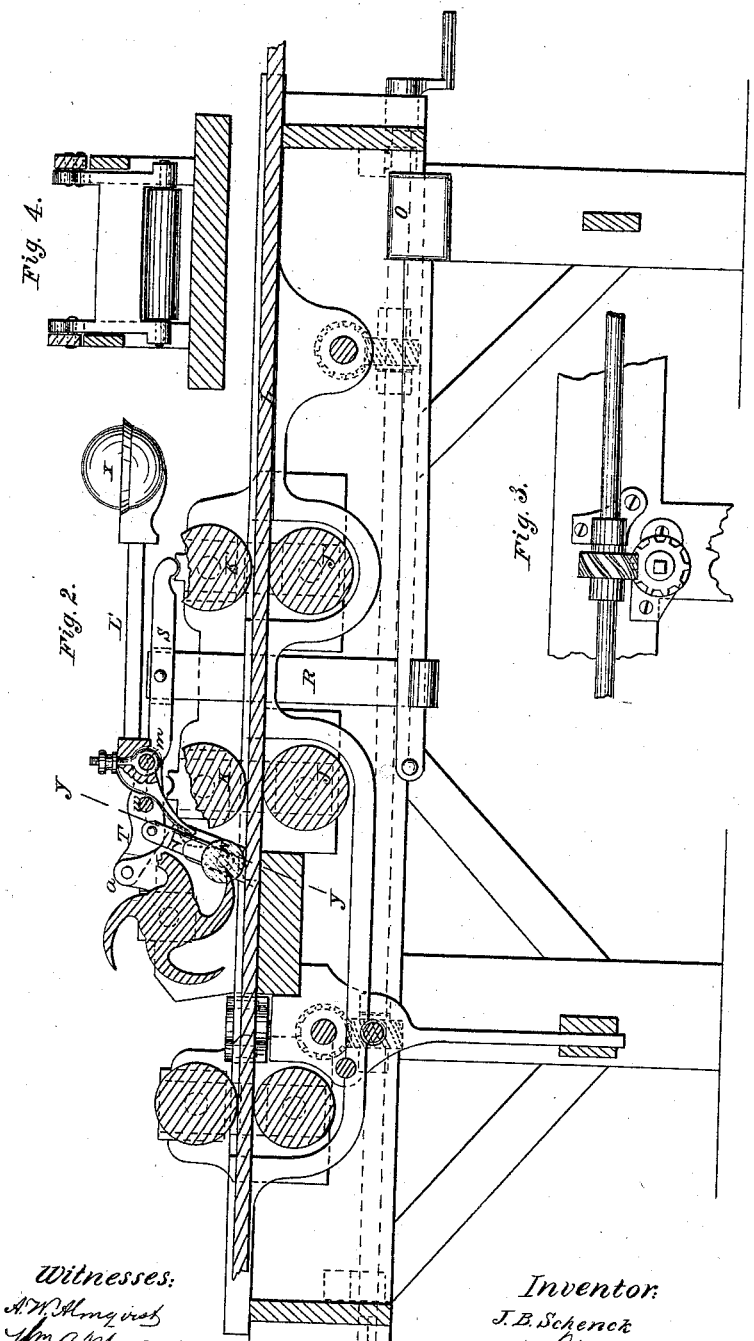

JOHN B. SCHENCK, OF MATTEAWAN, NEW YORK.

IMPROVEMENT IN PLANING-MACHINES.

Specification forming part of Letters Patent No. 86,469, dated February 2, 1869.

*To all whom it may concern:*

Be it known that I, JOHN B. SCHENCK, of Matteawan, in the county of Dutchess and State of New York, have invented a new and useful Improvement in Woodworth Planers; and I do hereby declare that the following is a full, clear, and exact description thereof, which will enable those skilled in the art to make and use the same, reference being had to the accompanying drawings, forming part of this specification.

This invention relates to new and useful improvements in machines known as "Woodworth planers," whereby they are made much more convenient and useful than they have hitherto been.

The invention consists, first in the combination of the introducing and discharging guides and one of the matcher-heads, whereby the guides and one of the matcher-heads are moved simultaneously, preserving their relative positions, across the machine, for the purpose of utilizing the cutting-edges of the cutters or planers throughout their entire length.

It consists, secondly, in the combination of the feed-rollers and intermediate devices with the pressure roll or bar, for the purpose of raising the pressure roll or bar before the lumber comes in contact therewith, to prevent said roll from being forced out of position or thrown in contact with the planer; and the invention consists, lastly, in the combination of the adjustable weight with the pressure-roll or bar, so that it shall bear equally upon the surface of the lumber, to prevent the same from canting.

In the accompanying plate of drawings, Figure 1 represents a top or plan view of the machine. Fig. 2, Sheet 2, is a vertical longitudinal section of Fig. 1, through the line $x\,x$. Fig. 3 is a detailed view, representing the oblique-toothed gearing which is used for operating the guides and side cutters of the machine. Fig. 4 is a detached section of Fig. 2, through the line $y\,y$.

Similar letters of reference indicate corresponding parts.

A represents the introducing-guide, and B the delivery-guide, of the machine. These guides are separate, and may be separately adjusted; but they are so arranged that they are moved simultaneously across the machine, and so that their relative positions are preserved.

The introducing-guide A is connected with and moved by the screw-shaft C C'.

The guide B is attached to and moved by the matching-head or side cutter G on the screw C', both of which screws are revolved by means of the oblique-toothed gearing seen at D D and the shaft E.

F represents the facing-cylinder, upon which the facing-cutters are placed.

G G' represent the matching-heads or side cutters, for reducing the width and matching the lumber.

The match-head G, delivery-guide B, and introducing-guide A are simultaneously moved by the revolution of the shaft E, and their relative positions are maintained at all times.

By thus rendering the guides adjustable across the machine, and preserving their relative positions during a simultaneous movement, I am enabled to use the facing-cutters throughout their entire length, thus greatly increasing their usefulness and saving much valuable time.

J J' represent the lower feed-rollers, and K K' the upper introducing feed-rollers. L represents the piece of lumber to be operated upon. N represents the pressure roll or bar, whichever may be used, which is placed immediately in the rear of the facing-cutters, as seen in the drawing.

The pressure is brought to bear upon the upper feed-rollers from the weights O O on the levers P P, connecting-bars R R, and saddles S S. The pressure-roll N is connected with two short horizontal levers, T T, which have their fulcra at $u$.

V is a broad bar which extends across the machine, which, in this example of my invention, forms the connection between the pressure-roll and the levers T T.

$w$ is a rod which extends across the machine, the ends of which project through the levers T T, and rest in bearings on the ends of the saddles S, which rest on the feed-roller boxes, as seen in the drawing.

The effect of this arrangement is as follows: When the piece of lumber is introduced and drawn under the feed-rollers K K', they are raised more or less, according to the thickness of the lumber, so that the weights O O will press them to the lumber, and draw the lumber into the machine.

The pressure-roll N is necessarily made small in diameter, so as to bring its bearing-surface on the lumber as near as practicable to the cutters. It is consequently not so readily raised by the contact of the piece of lumber as the larger feed-rollers; and where much is to be taken or cut from the lumber, a sudden jumping motion is produced, which sometimes produces disastrous consequences.

The arrangement is such that the relative positions of the feed-rollers and the pressure-roller is preserved, whether the lumber has more or less to be taken off. For instance, the proper position of the pressure-roller is one-eighth of an inch below the bottom of the feed-roller, and if a board is introduced which raises the feed-rolls, say, five-eighths of an inch, by arranging the parts so that the feed-roll K shall raise the pressure roll or bar, whichever may be used, five-eighths of an inch, their relative positions—i. e., the pressure-roller one-eighth of an inch below the feed-roller—would be maintained and all danger avoided. This eighth of an inch projection of the pressure-roll is necessary to give the required pressure upon the board. I accomplish this by raising the projecting ends of the bar w, which rest on the saddle S, by the board to be dressed.

This motion raises the levers T T, which are directly connected with the bar v and pressure-roll, so that when the board is brought under the pressure roll or bar, such roll or bar is raised only one-eighth of an inch, instead of five-eighths, as it would be without this device. The advantages of this arrangement will be at once manifest.

The pressure-roll being only about two inches in diameter, five-eighths of an inch would be more than it could be safely raised with the weight upon it; and just so when a pressure-bar is used, which is sometimes broken and carried in contact with the cutters, when a thick piece of lumber is introduced; or, perhaps, the roll or bar will refuse to rise at all, and the lumber is "stuck," the feed is stopped, and the gearing is strained, involving great liability to dangerous accident. This arrangement renders the collision of the roll or bar with the end of the lumber perfectly harmless.

The arrangement for adjusting the weight on the pressure roll or bar, to prevent the canting or tipping of the roll and equalizing the pressure on the surface of the lumber, is seen in the drawing, where L' represents a weighted lever, which is made to slide on the rod m, by which rod the two short levers T T are connected, so that the weight x may be made to bear directly over the piece of lumber in the machine.

The lever may be dispensed with, and the weight be made to slide upon the rod m.

The lever is preferable, because, by shifting the weight upon it, the amount of pressure may be varied, according to the width of the lumber.

I do not confine myself to the particular methods employed for producing the results named.

I am aware that the details may be varied somewhat, and the same or similar results be obtained.

Having thus described my invention, I claim as new and desire to secure by Letters Patent—

1. The combination of the guides A B and the matcher-head G, adapted to be moved simultaneously, as herein described, for the purpose specified.

2. The combination of the feed-roller K, saddles S, rod w, levers T, and bar V with the pressure-roller N, substantially as described, for the purpose specified.

3. The combination of the adjustable weight, the levers T, and bars V with the pressure-roller N, whereby the weight is adapted to bear directly over the piece of lumber being dressed, substantially as described, for the purpose specified.

JOHN B. SCHENCK.

Witnesses:
J. A. WOOD,
E. L. PHILLIPS.